United States Patent
Zhu (10) Patent No.: US 9,256,414 B2
(45) Date of Patent: Feb. 9, 2016

(54) METHOD, DEVICE AND SYSTEM FOR RUNNING APPLICATION

(75) Inventor: Yi'e Zhu, Beijing (CN)

(73) Assignee: Beijing Kingsoft Software Co., Ltd., Beijing (CN)

( * ) Notice: Subject to any disclaimer, the term of this patent is extended or adjusted under 35 U.S.C. 154(b) by 743 days.

(21) Appl. No.: 13/574,469

(22) PCT Filed: Dec. 16, 2010

(86) PCT No.: PCT/CN2010/079860
§ 371 (c)(1),
(2), (4) Date: Jul. 20, 2012

(87) PCT Pub. No.: WO2011/088714
PCT Pub. Date: Jul. 28, 2011

(65) Prior Publication Data
US 2012/0297034 A1    Nov. 22, 2012

(30) Foreign Application Priority Data
Jan. 22, 2010    (CN) .......................... 2010 1 0100336

(51) Int. Cl.
*G06F 15/16*    (2006.01)
*G06F 9/445*    (2006.01)
*H04L 29/08*    (2006.01)

(52) U.S. Cl.
CPC .. *G06F 8/61* (2013.01); *H04L 67/06* (2013.01)

(58) Field of Classification Search
CPC ................................. G06F 8/61; H04L 67/06
USPC .................................. 709/203, 217, 219, 223
See application file for complete search history.

(56) References Cited

U.S. PATENT DOCUMENTS

| 5,644,751 | A  | * | 7/1997  | Burnett ........................... 711/113 |
| 6,959,320 | B2 | * | 10/2005 | Shah et al. ...................... 709/203 |
| 2002/0035674 | A1 | * | 3/2002  | Vetrivelkumaran et al. .. 711/130 |
| 2004/0015844 | A1 | * | 1/2004  | Nicolle et al. ................. 717/114 |
| 2005/0003810 | A1 | * | 1/2005  | Chu et al. ....................... 455/418 |

(Continued)

FOREIGN PATENT DOCUMENTS

| CN | 1434402   | 8/2003 |
| CN | 101399696 | 4/2009 |

OTHER PUBLICATIONS

International Search Report and Written Opinion mailed Mar. 31, 2011 in PCT Application No. PCT/CN2010/079860.

(Continued)

*Primary Examiner* — Oanh Duong
(74) *Attorney, Agent, or Firm* — Plumsea Law Group, LLC (57) ABSTRACT

A method, a device and a system for running an application are disclosed. The method includes: creating a process corresponding to the application, and loading pre-generated data file description information of the application (101); monitoring I/O requests of the application through the process, and when an I/O request of the application is monitored, determining a type of a file to be accessed by the application according to the I/O request (102); if the type of the file to be accessed by the application is a data file, acquiring data blocks required by the application from a server side according to the data file description information (103); loading the data blocks into a memory (104). The technical solution can simply and efficiently decrease the installation package size of an application without special customization.

15 Claims, 3 Drawing Sheets

(56) References Cited

U.S. PATENT DOCUMENTS

| | | | |
|---|---|---|---|
| 2005/0065953 A1* | 3/2005 | Bower et al. | 707/101 |
| 2005/0071477 A1* | 3/2005 | Evans et al. | 709/228 |
| 2005/0289655 A1* | 12/2005 | Tidwell et al. | 726/27 |
| 2006/0048136 A1* | 3/2006 | Vries et al. | 717/174 |
| 2006/0136389 A1* | 6/2006 | Cover et al. | 707/3 |
| 2006/0225047 A1* | 10/2006 | Brothers et al. | 717/127 |
| 2007/0283345 A1* | 12/2007 | Fujishita | 717/174 |
| 2008/0016466 A1* | 1/2008 | Grasser et al. | 715/835 |
| 2008/0295110 A1* | 11/2008 | Muscarella et al. | 719/311 |
| 2009/0083733 A1 | 3/2009 | Chen et al. | |
| 2009/0320051 A1* | 12/2009 | Meerwald et al. | 719/328 |
| 2013/0047150 A1* | 2/2013 | Malasky et al. | 717/176 |

OTHER PUBLICATIONS

International Preliminary Report on Patentability (including Written Opinion of the ISA) mailed Jul. 24, 2012, in International Application No. PCT/CN2010/079860.

* cited by examiner

METHOD, DEVICE AND SYSTEM FOR RUNNING APPLICATION

This application claims the benefit of priority of the Chinese patent application No. 201010100336.7, entitled "Method, device and system for running application", filed to the Chinese Patent Office on Jan. 22, 2010, and its entire content is incorporated by reference as a part of the application.

TECHNICAL FIELD

The present invention relates to software technology, and more especially, to a method, device and system for running an application.

BACKGROUND OF THE RELATED ART

The files needed for running an application usually consist of two parts: program files and data files. For most applications, the volume of the data files is often larger than the volume of the program module files.

Too large application will not only take up too much storage space, but also result in excessive time costs of the users using the software. Therefore, in order to meet the application requirements of different users, there are a lot of slimmed-down versions of the software, that is, the simplified versions, in the market. The slimmed-down is made on the resource files in most of these products, and in general, they are specially customized. There are also some simplified versions of the software, for which simplified versions it needs to modify the source code of the original program to recompile and get a new program file, and to delete part of program files and data files in order to achieve the purpose of slimmed-down.

This approach has the following disadvantages.

1. Special customization is needed for different applications, and there is no general method which can be provided.

2. The functions of the software of the simplified versions are limited, if the users want to experience other functions, they need to reinstall another version.

SUMMARY OF THE INVENTION

Embodiments of the present invention provide a method, a device and a system for running an application to simply and efficiently reduce the volume of application installation package and provide users with desired functions without special customization.

To do this, the embodiments of the present invention provide the following technical solutions:

a method for running an application, comprising:

creating a process corresponding to the application, and loading pre-generated data file description information of the application;

monitoring I/O requests of the application through the process, and when an I/O request of the application is monitored, determining a type of a file to be accessed by the application according to the I/O request;

if the type of the file to be accessed by the application is a data file, acquiring data blocks required by the application from a server side according to the data file description information;

loading the data blocks into a memory.

Preferably, said loading the pre-generated data file description information of the application comprises:

loading the data file description information of the application from said server side.

Preferably, the method also comprises:

checking whether the data file description information of the application is stored in a specified local directory or not before creating the process corresponding to the application;

if yes, loading the data file description information from the specified directory;

if not, performing the step of loading the data file description information of the application from the server side.

Preferably, the method also comprises:

extracting data file of the application to generate the data file description information;

saving the data file description information to the specified local directory and/or the server side, and saving the data file to the server side.

Preferably, said monitoring the I/O requests of the application through the process comprises:

loading an I/O hook function through the process;

monitoring the I/O requests of the application through the I/O hook function when the application is running.

Preferably, said obtaining the data blocks required by the application from the server side according to the data file description information comprises:

checking whether the data file exists or not according to the data file description information;

sending a data block download request to the server side if the data file exists;

receiving the data blocks required by the application and sent by the server side.

Preferably, the method also comprises:

before sending the data block download request to said server side, checking whether the data blocks required by the application are stored in a local mapping file or not;

if yes, obtaining the data blocks required by the application from the mapping file;

if not, executing the step of sending the data block download request to the server side.

Preferably, the method also comprises:

after receiving the data blocks required by the application and sent by the server side, saving the data blocks into the mapping file, and updating header information of the mapping file;

said checking whether the data blocks required by the application are stored in the local mapping file or not comprises: checking the header information of the mapping file to determine whether the data blocks required by the application are stored in the local mapping file or not.

Preferably, the method also comprises:

after receiving the data block download request, the server side verifying the request and checking whether the requested data blocks exist or not;

if the verification is successful and the data blocks exist, sending the data blocks to a requesting party.

A device for running an application, comprising:

a process creation unit, which is used to create a process corresponding to the application, and load pre-generated data file description information of the application; a monitoring unit, which is used to monitor I/O requests of the application through the process, and, when an I/O request of the application is monitored, determine a type of a file to be accessed by the application according to the I/O request;

a network communication unit, which is used to acquire data blocks required by the application from a server side according to the data file description information after the monitoring unit determines that the type of the file to be accessed by the application program is data file;

a loading unit, which is used to load the data block into a memory.

Preferably, the network communication unit is also used to download the data file description information from the server side, and send the data file description information to the process creation unit.

Preferably, said device also comprises:

a storage unit, which is used to store the data file description information locally;

the network communication unit is also used to store the downloaded data file description information into said storage unit;

the process creation unit is also used to check whether the data file description information of the application is stored in said storage unit or not before creating the process corresponding to the application; if yes, extract and load the data file description information of the application from the storage unit; if not, send a notification to the network communication unit;

the network communication unit downloading the data file description information from the server side after receiving the notification sent by the process creation unit.

Preferably, said device also comprises:

a data file extraction unit, which is used to extract the data file of the application, generate the data file description information, and save the data file description information to the storage unit, and/or upload the data file description information to said server side through said network communication unit.

Preferably, said device also comprises:

a checking unit, which is used to check whether the data file exists or not according to the data file description information after the monitoring unit determines that the type of the file to be accessed by the application is the data file;

the network communication unit is specifically used to acquire the data blocks required by the application from said server side after the checking unit detects that the data file exists.

Preferably, said device also comprises:

a mapping unit, which is used to save a mapping file of the data blocks;

a data block extraction unit, which is used to extract the data blocks required by the application from the mapping unit;

the checking unit being also used to further check whether the data blocks required by the application is stored in the mapping file or not after determining that the data file exists; if yes, send a notification to said data block extraction unit; otherwise, send a notification to the network communication unit;

the data block extraction unit being specifically used to extract the data blocks required by the application from the mapping file stored in the mapping unit after receiving the notification sent by the checking unit, and send the data to the loading unit;

the network communication unit being specifically used to acquire the data blocks required by the application from said server side after receiving the notification sent by the checking unit, send the data blocks to the loading unit, save the data blocks into the mapping file, and synchronously update header information of the mapping file;

the checking unit judging whether the data blocks required by the application are stored in the local mapping file or not by checking the header information of the mapping file.

A system for loading an application, comprising: a client side and a server side;

the server side is used to save each data block required by the application of a data file;

the client side is used to create a process corresponding to the application, and load pre-generated data file description information of the application; monitor I/O requests of the application through the process, and after an I/O request of the application is monitored, determine a type of a file to be accessed by the application according to the I/O request; if the type of the file to be accessed by the application is data file, acquire data blocks required by the application from said server side according to the data file description information, and load the data blocks into a memory.

Preferably, the client side acquires the data blocks required by the application from the server side by sending a data file request to the server side;

the client side acquires the data blocks required by the application from the server side by sending a data file request to the server side;

the server side is also used to verify the request and check whether a requested data file exists or not after receiving the data file request;

if the verification is successful and the data file exists, send the data file to the client side.

A computer readable storage medium, comprising computer program codes which are executed by a computer unit so that the computer unit is able to:

create a process corresponding to the application, and load pre-generated data file description information of the application;

monitor I/O requests of the application through the process, and after an I/O request of the application is monitored, determine a type of a file to be accessed by the application according to the I/O request;

if the type of the file to be accessed by the application is a data file, acquire data blocks required by the application from the server side according to the data file description information;

load the data blocks into a memory.

The method, device and system for naming an application in accordance with the embodiment of the present invention, at the client side, load the pre-generated data file description information of the application, and monitor the I/O requests of the application, and after an I/O request of the application is monitored, determine the file type to be accessed by the application according to the I/O request, and acquire the data blocks required by the application from the server side according to the data file description information when the file type to be accessed by the application is the data file, and load the data blocks into the memory. In this way, the program files and the data files of the application can be separated and saved so that the user terminal only needs to install the program module file of the application, while the data files can be stored in an external network to be downloaded and installed according to the users' needs, thus effectively reducing the volume of the application and saving the storage space of the user terminal. The method in the embodiment of the present invention can simply and efficiently reduce the size of the application installation package and provide the required functions without specially customizing the simplified versions of the software.

PREFERRED EMBODIMENTS OF THE PRESENT INVENTION

In order to make those skilled in the art better understand the scheme of the embodiments of the present invention, the embodiments of the present invention will be described in further detail in the following with combination of the accompanying drawings and specific implementations.

According to the shortcomings existing in the prior art and taking into account that too large volume of the application is mainly due to the too large volume of the data files, the method, device and system for running an application in accordance with the embodiments of the present invention save separately the program files and the data files of the application. At the client side, the method, device and system for running an application in accordance with the embodiments of the present invention load the pre-generated data file description information of the application, monitor the I/O requests of the application, and after an I/O request of the application is monitored, determine the type of the file to be accessed by the application according to the I/O request, and acquire the data blocks required by the application from the server side according to the data file description information when the type of the file to be accessed by the application is the data file, and load the data blocks into the memory. Therefore, the user terminal only needs to install the program files of the application, while the data files can be stored in the external network to be downloaded and installed according to the users' needs, thus effectively reducing the volume of the application and saving the storage space of the user terminal, moreover, it can simply and efficiently reduce the size of the application installation package and provide the required functions without specially customizing the simplified versions of the software.

Figure 1:
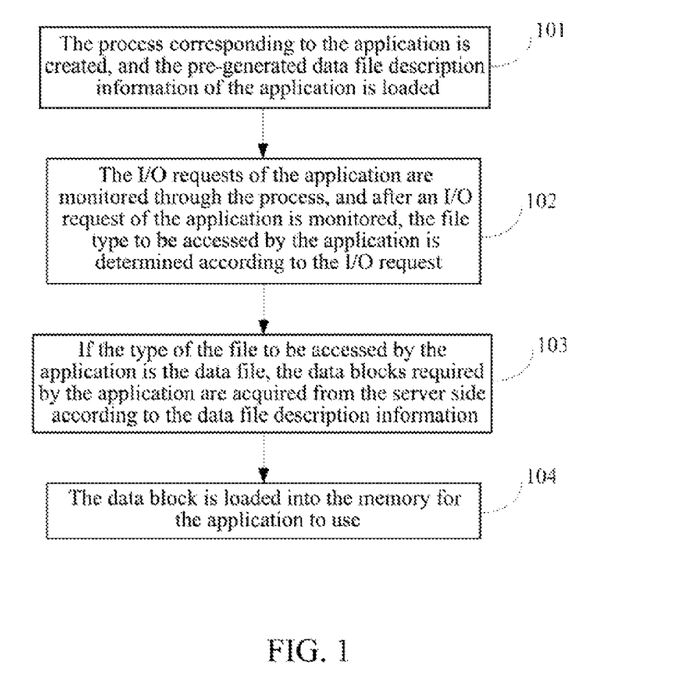
FIG. 1 is a flow chart of a method for running an application in accordance with an embodiment of the present invention.

FIG. 1 is a flow chart of the method for running an application in accordance with an embodiment of the present invention, comprising the following steps.

In step 101, the process corresponding to the application is created, and the pre-generated data file description information of the application is loaded.

The data file description information might be generated by pre-extracting the data files of the application, and the extraction process is executed in a terminal that has been installed with the application, and the terminal might be a terminal miming the application, or any other terminal.

For example, suppose a wps installation package is deployed in a terminal, and the installation directory of the wps is: C:\Program Files\Kingsoft\WPS Office Personal, then the data file description information corresponding to the wps can be generated through the following process:

first, traverse the folders and files in the directory, analyze specifically the number of files in this directory, which files are the data files, and which files are the program files. Specifically, the program files and the data files can be distinguished according to the file names and/or their extensions, for example, most dll files and exe files in the directory C:\Program Files\Kingsoft\WPS Office Personal\office6 are the program files, and most of the files in the directory C:\Program Files \Kingsoft\WPS Office Personal\media are the data files.

In addition, the file type can be determined by analyzing the binary format of a file.

After the traverse and analysis, a description file, that is, the data file description information, is generated. The description file mainly comprises the following information: the number of data files contained in the application; name, size, and MD5 check code, and so on, of each data file. In addition, the data file description information might further comprise: the mapping file name of each data file. Wherein, the mapping file indicates the mapping information of the data files stored in the user terminal, which will be described in detail in the following.

Of course, according to the application needs, there might be other information, which is not limited by the embodiments of the present invention.

In the embodiments of the present invention, the data file description information can be locally saved and/or saved in the server side, and the data files are saved in the server side.

Before creating the process corresponding to the application, it needs to check whether the data file description information of the application is saved in the specified local directory or not; if yes, directly load the data file description information from the local; otherwise, load the data file description information by downloading it from the server side. Furthermore, the downloaded data file description information can be saved to the specified local directory. Therefore, when it needs to load the data file description information of the application later, the data file description information can be directly loaded from the specified local directory rather than downloaded from the server side.

In step 102, the I/O requests of the application are monitored through the process, and after an I/O request of the application is monitored, the file type to be accessed by the application is determined according to the I/O request.

Specifically, the process can hook the I/O application interface functions (such as CreateFile, GetFile Attributes, SetFilePointer, CloseHandle, GetFileSize, ReadFile, WriteFile) of the files of the application, that is, load the I/O hook functions, to monitor the I/O requests of the application. After the application is running, if there is an I/O request, the I/O request can be monitored and intercepted by the I/O hook functions.

In the field of computer programming, the hooks can be used to intercept function calls and message transmissions between software components, thereby changing the implementation results of the function call or the content of the message transmission.

In the embodiment of the present invention, after an I/O hook function finds an I/O request of the application, the handle of the file to be accessed by the application is acquired according to the I/O request, and the file related information, such as file name, size, attributes such as read-only/read-write, and so on can be acquired according to the file handle, and the type of the file to be accessed can be determined based on this information. For example, if the data file description information of the application contains the file name, it means that the file to be accessed by the application is a data file.

In step 103, if the type of the file to be accessed by the application is the data file, the data blocks required by the application are acquired from the server side according to the data file description information.

As the above mentioned, the data file description information might comprise the following information: the file name, size and MD5 check code of each data file. Therefore, the I/O hook functions can check whether the data file to be accessed by the application exists or not according to the data file description information. If the data file description information contains the name of the data file to be accessed by the application, it indicates that the data file exists; otherwise, it indicates that the data file does not exist.

If the data file is checked as not existing, an error message can be returned to the user.

If the data file is checked as existing, the data blocks required by the application can be obtained from the server side. Specifically, a data block download request can be sent to the server; and the data blocks required by the application and sent by the server-side are received. The data blocks are part or all of the data in the data file.

After the server side receives the data file request, it might also verify the request and check whether the requested data file exists or not; if the request is verified successfully and the data file exists, send the data file to the requesting party. In this way, the security of the data can be further ensured.

Similarly, in order to facilitate the requirements on loading the data blocks when the application is running again later and to save the time cost on loading, after the data blocks required by the application are acquired from the server side, the data blocks can be mapped to the local mapping file.

Accordingly, in the embodiment of the present invention, before obtaining the data blocks required by the application from the server, it might further check whether the data blocks required by the application are stored in the local mapping file or not. If the data blocks are stored in the local mapping file, the data blocks required by the application can be directly extracted from the mapping file; otherwise, the data blocks required by the application can be required from the server side.

The mapping file might comprise two parts: the header information and the data information. Wherein, the header information comprises: the index information, such as the name, the offset address, and so on, of each data block contained in the mapping file. In this way, when checking whether the data blocks required by the application are stored in the local mapping file or not, there is no need to traverse the entire mapping file, and it can be determined simply based on the contents of the header information, thus facilitating the search of the information stored in the mapping file.

Accordingly, in order to guarantee that the header information in the mapping file corresponds to the data information, after saving the data blocks obtained from the server side into the mapping file, it also needs to synchronously update the header information of the mapping file.

Of course that the embodiment of the present invention is not limited to the aforementioned implementation, for example, in order to save the memory space of the user terminal, it can also not save the data blocks in the local, and at each time that the application runs, if it is needed to access to the data files, the appropriate data blocks are downloaded from the server side.

In addition, since when the application accesses to the data files, sometimes it might only need to access to one or more data blocks in the data file, therefore, at each time of downloading the data file from the server side, the data file to be accessed by the application can be completely downloaded to the local, or only the data blocks to be accessed by the application in the data file are downloaded. Of course, the application might also access the data blocks not in accordance with the boundaries of the data blocks, and sometimes, it might only access to a part of a data block, and at some other times, it might access to several consecutive data blocks. Which way the application would use is determined according to the offset and/or data size of the file to be accessed by the application through a certain algorithm, and then it is converted to the corresponding data blocks and mapped to the mapping file. In other words, the format of the data blocks in the locally stored mapping file might be different from the format of the downloaded data blocks, but they have a certain mapping relationship.

In step 104, the data block is loaded into the memory for the application to use.

The method for running an application in accordance with an embodiment of the present invention loads the pre-generated data file description information of the application and monitors the I/O requests of the application, and after an I/O request of the application is monitored, determine the file type to be accessed by the application according to the I/O request, and acquire the data blocks required by the application from the server side according to the data file description information when the file type to be accessed by the application is the data file, and load the data block into the memory. Therefore, the user terminal only needs to install the program module file of the application, while the data files can be stored in an external network to be downloaded and installed according to the users' needs, thus effectively reducing the volume of the application and saving the storage space of the user terminal. The method in the embodiment of the present invention can simply and efficiently reduce the size of the application installation package and provide the required functions without specially customizing the simplified versions of the software.

Those skilled in the field can understand that all or part of the steps in the method embodiment can be achieved with the program instructing the related hardware, and the program can be stored in a computer readable storage medium, and the storage media can be such as: ROM/RAM, disk, CD-ROM, and so on.

Figure 2:
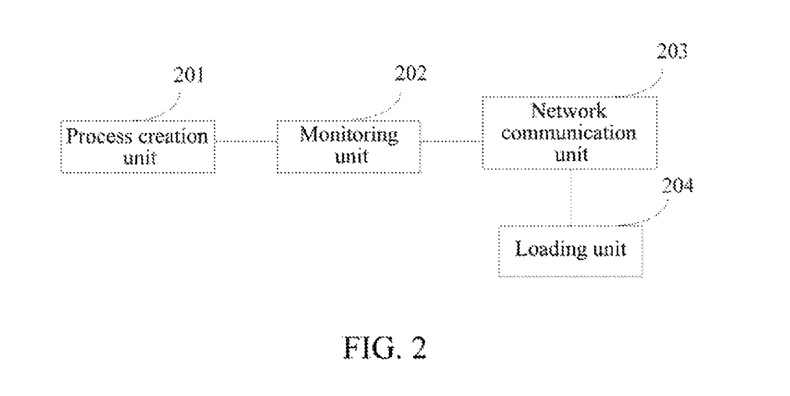
FIG. 2 is a structural diagram of a device for running an application in accordance with an embodiment of the present invention.

Accordingly, the embodiment of the present invention also provides a device for running an application, and the FIG. 2 is a schematic diagram of the device.

In this embodiment, the device comprises: the process creation unit 201, the monitoring unit 202, the network communication unit 203 and the loading unit 204. Wherein, the process creation unit 201 is used to create a process corresponding to the application, and load pre-generated data file description information of the application.

The data file description information might be stored in the local or the server side. Of course, the data file description information can be stored in both the local and the server side.

As the above mentioned, the data file description information can be generated through extracting the data files of the application by the user terminal which is installed with the application, and saved in the local and/or the server-side; or generated by other user terminals and then saved in the server side. The specific content and generation process of the data file description information can refer to the description in the method for running an application in accordance with the embodiment of the present invention and are not discussed here.

Accordingly, when the process creation unit 201 loads the data file description information, it might load the data file description information from the local or acquire from the server side to load, and the specific process will be described in detail in the following.

It should be noted that, the data files of the application also need to be pre-stored in said server side.

The monitoring unit 202 is used to monitor the I/O requests of the application through the process, and after an I/O request of the application is monitored, the type of the file to be accessed is determined by the application according to the I/O request.

Specifically, the process can hook the I/O application interface functions (such as CreateFile, GetFile Attributes, SetFilePointer, CloseHandle, GetFileSize, ReadFile, WriteFile) of the files of the application, that is, load the I/O hook functions, to monitor the I/O requests of the application. After the application is running, if there is an I/O request, it can be found and intercepted by the I/O hook functions.

After an I/O hook functions monitors an I/O request of the application, the type of the file to be accessed is determined by the application according to the I/O request.

The network communication unit 203 is used to obtain the data blocks required by the application from the server side according to the data file description information after the monitoring unit 202 determines that the type of the file to be accessed by the application is the data file.

As the above mentioned, the data files of the application are pre-stored in the server side, usually, since one data file contains one or more data blocks, while the application might need only some of the data blocks when accessing to a data file, therefore, in the embodiment of the present invention, the data block acquisition unit 203 might acquire only the data blocks required by the application from the server side.

The loading unit 204 is used to load the data blocks into the memory.

It can be seen that the device for running an application in accordance with an embodiment of the present invention loads the pre-generated data file description information of the application and monitors the I/O requests of the application, and after an I/O request of the application is monitored, determine the file type to be accessed by the application according to the I/O request, and acquire the data blocks required by the application from the server side according to the data file description information when the file type to be accessed by the application is the data file, and load the data block into the memory. Therefore, the user terminal only needs to install the program module file of the application, while the data files can be stored in an external network to be downloaded and installed according to the users' needs, thus effectively reducing the volume of the application and saving the storage space of the user terminal. The device in the embodiment of the present invention can simply and efficiently reduce the size of the application installation package and provide the required functions without specially customizing the simplified versions of the software.

As the above mentioned, the data file description information can be pre-generated by the other user terminals and saved in the server side, to do this, in an embodiment of the device for running an application in accordance with the present invention, the network communication unit 203 is also used to download the data file description information from the server side and send the data file description information to the process creation unit 203.

Figure 3:
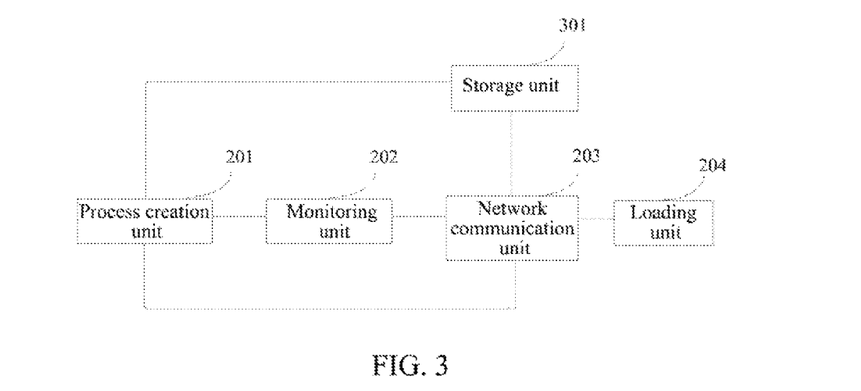
FIG. 3 is another structural diagram of a device for running an application in accordance with an embodiment of the present invention.

FIG. 3 is another structural diagram of the device for running an application in accordance with an embodiment of the present invention.

Different from the embodiment shown in FIG. 2, in this embodiment, the device also comprises:

the storage unit 301, which is used to save the data file description information into the local;

the network communication unit 203, which is also used to save the downloaded data file description information in the storage unit 301.

In this embodiment, at the first time that the process creating unit 201 loads the data file description information, the loading can only be executed by the network communication unit 203 downloading the data file description information from the server side, when the application runs again later, the data file description information can be directly loaded from said storage unit 301.

Correspondingly, the process creation unit 201 is also used to, before creating the process corresponding to the application, check whether the data file description information of the application is stored in said storage unit 301 or not; if yes, extract and load the data file description information of the application from the storage unit 301; otherwise, send a notification to said network communication unit 203. After the network communication unit 203 receives the notification sent by the process creation unit 201, the network communication unit 203 downloads the data file description information from the server side, returns the data file description information to the process creation unit 201 and saves the data file description information into the storage unit 301.

As the above mentioned, the data file description information might also be generated through extracting the data files of the application by the user terminal that is installed with the application.

Figure 4:
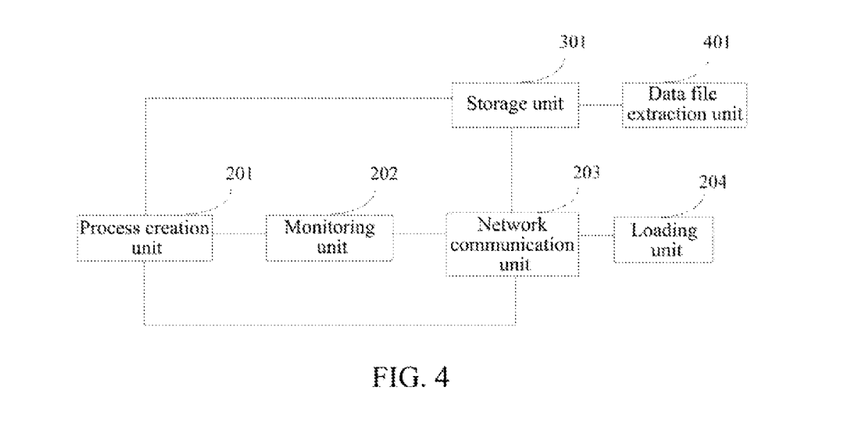
FIG. 4 is still another structural diagram of a device for running an application in accordance with an embodiment of the present invention.

FIG. 4 is another structural diagram of the device for running an application in accordance with an embodiment of the present invention.

Different from the embodiment shown in FIG. 3, in this embodiment, the device also comprises:

the file data extraction unit 401, which is used to extract the data files of the application, generate the data file description information, and save the data file description information into said storage unit 301.

Of course, in another embodiment of the device for running an application in the present invention, the data file extraction unit 401 might also upload the data file description information to the server side through the network communication unit 203.

Of course, the data file extraction unit 401 might save the data file description information into said storage unit 301 and also upload the data file description information to the server side through the network communication unit 203 at the same time.

In this embodiment, at the first time that the process creation unit 201 loads the data file description information, it can directly load the data file description information from said storage unit 301.

Correspondingly, the process creation unit 201 is also used to, before creating the process corresponding to the application, check whether the data file description information of the application is stored in said storage unit 301 or not; if yes, extract the data file description information of the application from the storage unit 301 to load; otherwise, send a notification to said network communication unit 203. After the network communication unit 203 receives the notification from the process creation unit 201, it downloads the data file description information from said server side, returns the data file description information to the process creation unit 201, and saves the data file description information into the storage unit 301.

Figure 5:
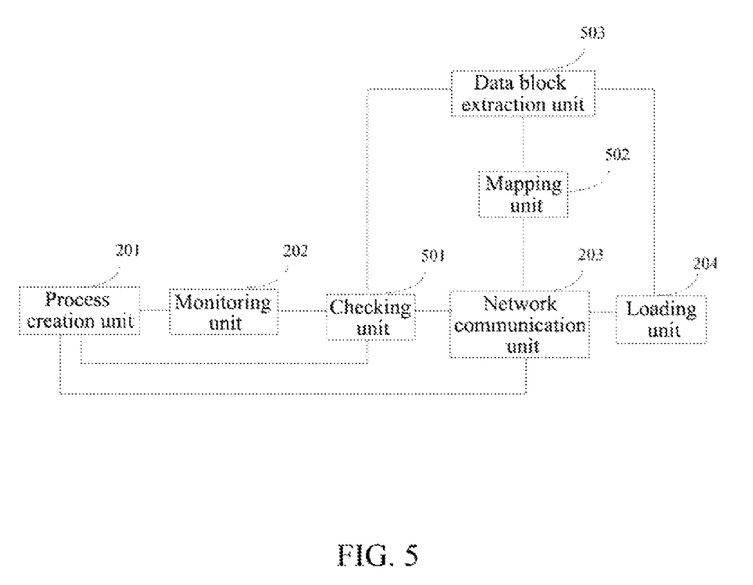
FIG. 5 is still another structural diagram of a device for running an application in accordance with an embodiment of the present invention.

FIG. 5 is another structural diagram of the device for running an application in accordance with an embodiment of the present invention.

Different from the embodiment shown in FIG. 2, in this embodiment, the device also comprises:

the checking unit 501, which is used to check whether the data file exists or not according to the data file description information loaded by the process creation unit 201 after the monitoring unit 202 determines that the type of the file to be accessed by the application is the data file.

In this embodiment, the network communication unit 203 needs to acquire the data blocks required by the application from said server side after the checking unit 501 checked that the data file exists.

Of course, the checking unit 501 can also be used in the above embodiments shown in the FIG. 3 and the FIG. 4.

To further facilitate the loading requirements of the loaded data blocks when the application runs later, in the embodiment of the present invention, it might further comprise: the mapping unit 502 and the data block extraction unit 503. Wherein:

the mapping unit 502 is used to save the mapping file of the data blocks;

the data block extraction unit 503 is used to extract the data blocks required by the application from said mapping unit 502.

In this embodiment, the checking unit 501 is also used to further check whether the data blocks required by the application are stored in the mapping file or not after determining that the data file exists; if yes, send a notification to the data block extraction unit 503; otherwise, send a notification to said network communication unit 203.

Accordingly, the data block extraction unit 503 is specifically used to extract the data blocks required by the application from the mapping file stored in the mapping unit 502 after receiving the notification from the checking unit 501 and send the data blocks to the loading unit 204.

Similarly, the network communication unit 203 is specifically used to acquire the data blocks required by the application from said server side after receiving the notification sent by said checking unit 501, and send the data blocks to the loading unit 204. At the same time, it also saves the data blocks into the mapping file.

The device for running applications in accordance with the embodiment of the present invention loads the pre-generated data file description information of the application and monitors the I/O requests of the application, and after an I/O request of the application is monitored, determine the file type to be accessed by the application according to the I/O request, and acquire the data blocks required by the application from the server side according to the data file description information when the file type to be accessed by the application is the data file, and load the data blocks into the memory. Therefore, the user terminal only needs to install the program module file of the application, while the data files can be stored in an external network to be downloaded and installed according to the users' needs, thus effectively reducing the volume of the application and saving the storage space of the user terminal. The method in the embodiment of the present invention can simply and efficiently reduce the size of the application installation package and provide the required functions without specially customizing the simplified versions of the software.

Furthermore, the network communication unit 203 obtains the data blocks required by the application from the server side and saves them into the mapping file, so that the application can directly obtain the data blocks from the local when it runs at a later time, and there is no need to acquire the data blocks through the network, thus effectively speeding up the loading time of the data blocks and maximally saving the local storage space.

In the embodiment of the present invention, the mapping file might comprise the two parts of contents, the header information and data information. To do this, at the same time when the network communication unit 203 saves the data blocks acquired from the server side to the mapping file, it also needs to synchronously update the header information of the mapping file. Therefore, the checking unit 501 does not need to traverse the entire mapping file when it checks whether the data blocks required by the application are stored in the local mapping file or not, and it only needs to check the header information of the mapping file in order to judge whether the data blocks required by the application are stored in the local mapping file or not.

It should be noted that, in the embodiment of the present invention, the format of the data blocks in the mapping file might be different from the format of the data blocks downloaded from the server-side, but they have a certain mapping relationship.

The embodiment of the present invention also provides a system for running an application, the system comprising: a client side and a server side;

the server side is used to save each data block required by the application of a data file;

the client side is used to create a process corresponding to the application, and load pre-generated data file description information of the application; monitor I/O requests of the application through the process, and after an I/O request of the application is monitored, determine a type of a file to be accessed by the application according to the I/O request; if the type of the file to be accessed by the application is data file, acquire data blocks required by the application from said server side according to the data file description information, and load the data blocks into a memory.

In the embodiment of the present invention, the client side might be the device for running the applications in each above embodiment.

In addition, the client side acquires the data blocks required by the application from the server side by sending a data file request to the server side. Correspondingly, the server side is also used to verify the request and check whether the requested data file exists or not after receiving the data file request; if the verification is successful and the data file exists, send the data file to the client side.

The system for running an application in accordance with the embodiments of the present invention can achieve the smooth running and on-demand downloading without specially customizing the specific software, that is, the user terminal at the client side only needs to install part of the files in the full version of the software, while the rest of the needed files are downloaded from the server in the format of data stream, which can effectively save the user's disk space. The system for running an application in accordance with the embodiment of the present invention has strong versatility and has a very good effect on most of the software and online games in the market. Furthermore, the restriction on function uses by different users can be achieved by controlling the download of data files.

The embodiments of the present invention are described in detail in the above, and the specific embodiments are used in the context to illustrate the present invention, and the illustration of the above embodiments is only used to help the readers understand the method and device of the present invention; meanwhile, for those skilled in the field, based on the idea of the present invention, there might be changes on the specific implementations and the application ranges, therefore, the content of the specification should be a restriction of the present invention.

What is claimed is:

1. A device for running an application, comprising
a processor, a storage device, and a plurality of modules stored in the storage device, the modules comprising:

a process creation module, which is configured to create a process corresponding to the application, and load pre-generated data file description information of the application;

a monitoring module, which is configured to monitor I/O requests of the application through the process, and, when an I/O request of the application is monitored, determine a type of a file to be accessed by the application according to the I/O request;

a network communication module, which is configured to acquire data blocks required by the application from a server according to the data file description information after the monitoring module determines that the type of the file to be accessed by the application program is a data file; and a loading module, which is configured to load the data blocks into a memory;

a checking module, which is configured to check whether the data file exists or not according to the data file description information after the monitoring module determines that the type of the file to be accessed by the application is the data file; and the network communication module is configured to acquire the data blocks required by the application from the server after the checking module detects that the data file exists;

a mapping module, which is configured to save a mapping file of the data blocks;

a data block extraction module, which is configured to extract the data blocks required by the application from the mapping module;

the checking module being further configured to further check whether the data blocks required by the application is are stored in the mapping file or not after determining that the data file exists; if yes, send a notification to the data block extraction module; otherwise, send a notification to the network communication module;

the data block extraction module being further configured to extract the data blocks required by the application from the mapping file stored in the mapping module after receiving the notification sent by the checking module, and send the data to the loading module;

the network communication module being further configured to acquire the data blocks required by the application from the server after receiving the notification sent by the checking module, send the data blocks to the loading module, save the data blocks into the mapping file, and synchronously update header information of the mapping file; and the checking module judging whether the data blocks required by the application are stored in the local mapping file or not by checking the header information of the mapping file.

2. The device of claim 1, wherein,
the network communication module is further configured to download the data file description information from the server, and send the data file description information to the process creation module.

3. The device of claim 2, wherein, the device further comprises:
a storage module, which is configured to store the data file description information locally;
the network communication module is further configured to store the downloaded data file description information into the storage module;

the process creation module is further configured to check whether the data file description information of the application is stored in the storage module or not before creating the process corresponding to the application; if yes, extract and load the data file description information of the application from the storage module; if not, send a notification to the network communication module; and the network communication module downloading the data file description information from the server after receiving the notification sent by the process creation module.

4. The device of claim 3, wherein, the device further comprises:
a data file extraction module, which is used to extract the data file of the application, generate the data file description information, and save the data file description information to the storage module, and/or upload the data file description information to the server through the network communication module.

5. A system for loading an application, comprising: a client and a server;
the server is configured to save each data block required by the application of a data file; and
the client is configured to create a process corresponding to the application, and load pre-generated data file description information of the application; monitor I/O requests of the application through the process, and after an I/O request of the application is monitored, determine a type of a file to be accessed by the application according to the I/O request; if the type of the file to be accessed by the application is a data file, acquire data blocks required by the application from the server according to the data file description information, and load the data blocks into a memory;
wherein the client is further configured to check whether the data blocks required by the application are stored in a mapping file or not after determining that the data file exists; extract the data blocks required by the application from the mapping file after receiving a notification, acquire the data blocks required by the application from the server after receiving the notification, save the data blocks into the mapping file, and synchronously update header information of the mapping file; and judge whether the data blocks required by the application are stored in the local mapping file or not by checking the header information of the mapping file.

6. The system of claim 5, wherein,
the client acquires the data blocks required by the application from the server by sending a data file request to the server;
the server is further configured to verify the request and check whether a requested data file exists or not after receiving the data file request; and
if the verification is successful and the data file exists, send the data file to the client.

7. A method for running an application, comprising:
creating a process corresponding to the application, and loading pre-generated data file description information of the application;
monitoring I/O requests of the application through the process, and when an I/O request of the application is monitored, determining a type of a file to be accessed by the application according to the I/O request;
if the type of the file to be accessed by the application is a data file, acquiring data blocks required by the application from a server according to the data file description information; and loading the data blocks into a memory;
wherein, the method further comprises:
  checking whether the data blocks required by the application is stored in a mapping file or not after determining that the data file exists; extracting the data blocks required by the application from the mapping file after receiving a notification, acquiring the data blocks required by the application from the server after receiving the notification; saving the data blocks into the mapping file, and synchronously updating header information of the mapping file; and judging whether the data blocks required by the application are stored in the local mapping file or not by checking the header information of the mapping file.

8. The method of claim 7, wherein, loading the pre-generated data file description information of the application comprises:
  loading the data file description information of the application from the server.

9. The method of claim 8, wherein, the method further comprises:
  checking whether the data file description information of the application is stored in a specified local directory or not before creating the process corresponding to the application;
  if yes, loading the data file description information from the specified directory; and
  if not, performing the step of loading the data file description information of the application from the server.

10. The method of claim 9, wherein, the method further comprises:
  extracting data file of the application to generate the data file description information; and
  saving the data file description information to the specified local directory and/or the server, and saving the data file to the server.

11. The method of claim 7, wherein, monitoring the I/O requests of the application through the process comprises:
  loading an I/O hook function through the process; and
  monitoring the I/O requests of the application through the I/O hook function when the application is running.

12. The method of claim 7, wherein, obtaining the data blocks required by the application from the server according to the data file description information comprises:
  checking whether the data file exists or not according to the data file description information;
  sending a data block download request to the server if the data file exists; and
  receiving the data blocks required by the application and sent by the server.

13. The method of claim 12, wherein, the method further comprises:
  before sending the data block download request to the server, checking whether the data blocks required by the application are stored in a local mapping file or not;
  if yes, obtaining the data blocks required by the application from the mapping file; and
  if not, executing the step of sending the data block download request to the server.

14. The method of claim 13, wherein, the method further comprises:
  after receiving the data blocks required by the application and sent by the server, saving the data blocks into the mapping file, and updating header information of the mapping file; and
  checking whether the data blocks required by the application are stored in the local mapping file or not comprises: checking the header information of the mapping file to determine whether the data blocks required by the application are stored in the local mapping file or not.

15. The method of claim 12, wherein, the method further comprises:
  after receiving the data block download request, the server verifying the request and checking whether the requested data blocks exist or not; and
  if the verification is successful and the data blocks exist, sending the data blocks to a requesting party.

* * * * *